United States Patent [19]

Smith et al.

[11] Patent Number: 4,614,555

[45] Date of Patent: Sep. 30, 1986

[54] APPARATUS AND PROCESS FOR MAKING PLYWOOD USING CONTROL MEANS AND PATCHING MATERIAL

[75] Inventors: Albert C. Smith; Dennis W. Owen, both of Eugene, Oreg.

[73] Assignees: Champion International Corporation, Stamford, Conn.; Williamette Valley Co., Eugene, Oreg.

[21] Appl. No.: 712,756

[22] Filed: Mar. 18, 1985

[51] Int. Cl.[4] .............................................. B32B 35/00

[52] U.S. Cl. ...................................... 156/64; 144/332; 156/94; 156/98; 156/353; 156/356; 264/36; 428/63

[58] Field of Search .................... 144/332; 156/94, 98, 156/64, 378, 353, 356; 264/36; 428/63

[56] References Cited

U.S. PATENT DOCUMENTS

| | | | |
|---|---|---|---|
| Re. 26,653 | 8/1969 | Skoog | 144/332 |
| 1,689,705 | 10/1928 | Walker . | |
| 2,336,703 | 12/1943 | Skoog . | |
| 2,337,792 | 12/1943 | Yokell | 156/98 X |
| 2,454,016 | 11/1948 | Skoog . | |
| 2,536,665 | 1/1951 | Skoog . | |
| 2,583,396 | 1/1952 | Skoog . | |
| 2,649,876 | 8/1953 | Thompson et al. . | |
| 2,674,770 | 4/1954 | Bennett et al. . | |
| 2,675,038 | 4/1954 | Carlson . | |
| 3,547,170 | 12/1970 | Maxey et al. | 144/332 |
| 3,616,117 | 10/1971 | Anderson et al. . | |
| 3,741,853 | 6/1973 | Forsythe et al. . | |
| 3,844,863 | 10/1974 | Forsythe et al. . | |

*Primary Examiner*—Robert A. Dawson

*Attorney, Agent, or Firm*—Evelyn M. Sommer; Anthony J. Casella; Gerald E. Hespos

[57] ABSTRACT

An apparatus and process are provided for the production of plywood. The apparatus is adapted to form plywood panels without prior patching of defects in the veneer sheets used to form the panel. The formed panel then is electro-optically scanned to identify and locate defects. The sensed defect data is stored in a control unit which in turn directs a defect removal apparatus and a patcher to appropriate locations for removing and patching the defects.

11 Claims, 4 Drawing Figures

APPARATUS AND PROCESS FOR MAKING PLYWOOD USING CONTROL MEANS AND PATCHING MATERIAL

BACKGROUND OF THE INVENTION

Plywood panels are formed from a plurality of layers of wood veneer disposed in face-to-face relationship with the grain on alternate layers extending in generally othogonal directions. In the prior art, the veneer generally is peeled from a log, dried and then prepared to eliminate defects such as knots, knot holes and the like. The prepared veneer layers then are laid up in face-to-face relationship with appropriate adhesives disposed therebetween. These veneer layers are then urged toward one another under appropriate conditions of heat and pressure to form a substantially integral plywood panel structure. The panel then may be cut into smaller panels of appropriate size, and any remaining defects may be routed and patched. The panel then may be sanded and subjected to a quality control inspection. Panels that are still deemed defective may be returned to the routing and patching stations or to the sanding station to assure that necessary quality control is achieved. The completed panels then are appropriately packaged and shipped.

In the past, the preparation of veneer sheets and the routing and patching on completed panels have been carried out manually based upon the visual perceptions of inspectors. Typically the defects in the veneer sheets used in the plywood panel have been corrected by stamping, routing or otherwise removing generally boat-shaped portions of preselected and uniform sizes from the veneer sheet at substantially the location of an observed defect. Specifically, the inspector could manually remove the observed defects by cutting uniform boat-shaped apertures in the veneer, or the inspector could direct an automated stamping or routing apparatus to the respective locations of the defects to effect the formation of boat-shaped apertures therein. Boat-shaped wooden patches then were inserted in the formed apertures.

There are several reasons for forming uniform and substantially identical apertures in the defective plywood sheets regardless of the specific size or shape of the defect. For example, the formation of uniform apertures in the veneer sheet of the prior art avoids the need to manually or visually inspect and measure the size of defects. Second, all patches are identical, and there is no need to match the patch to the particular defect, size and shape. Finally, it has been observed that if wooden patches are to be used, there are operational and performance advantages to using patches having a boat or oval shape. Specifically, the respective grains of the wooden patch and the veneer sheet can be made to match more closely. In certain instances, circular or diamond shaped patches have been used.

Several examples of patching veneer sheets during the formation of plywood are shown in U.S. Pat. No. 2,336,703, U.S. Pat. No. 2,454,016, U.S. Pat. No. 2,536,665 and U.S. Pat. No. 2,583,396 all of which issued to P. F. Skoog. Still other such patches and methods of patching are shown in U.S. Pat. No. 1,689,705 to F. L. Walker, U.S. Pat. No. 2,649,876 to W. F. Thompson et al, U.S. Pat. No. 2,674,770 to E. V. Bennett et al, U.S. Pat. No. 2,675,038, to Carlson and U.S. Pat. No. 3,616,117 to Anderson et al. Forsythe et al shown in U.S. Pat. No. 3,741,853 and U.S. Pat. No. 3,844,863 that defects in laid up panels can be routed out, and the resulting hole in the panel can be filled with a filler composition having a flowable liquid consistency. The filler of the Forsythe et al references includes a mixture of cork particles and resin, wherein the cork particles stratify to the uppermost region and can readily be sanded or otherwise finished.

Prior art plywood panels often are graded with the particular grade signifying the range of possible end pieces that may be available. For example, plywood panels having no defects on the outer layer usually are classified as grade A indicating that the panel may be finished with a transparent or semi-transparent coating and used in furniture, cabinets, wall panels or other structures where the panel is unpainted, visible and necessarily of high aesthetic quality. Grade B usually denotes panels that require a smooth finish but that will be painted or otherwise coated with an opaque medium. Grade B panels may include a plurality of the above described boat-shaped patches or fillers provided the surface of the panel is smooth and the perimeters of the patches are not readily observable. Grade C may define panels that are not properly patched and therefore are usable only in situations where the panel will not readily be observed.

The above described patching techniques have several deficiencies. For example, the entire prior art patching procedure has relied extensively on visual observations and manual defect removal, or at least manual control of an apparatus for removing defects. In this respect, the prior art patching process has been subjected to human failures and has required a relatively high labor intensity. For example, a typical plywood production line may include five people to perform routing/patching operations. Furthermore, the prior art patches, such as those shown in the above identified Skoog Patent references, have negatively affected the quality of the resulting panels. Thus, a panel having the widely used boat shaped patches can never achieve the A grade described above. On the other hand, the known patching techniques such as those shown in the Forsythe et. al. patents identified above have added even more to manufacturing time and cost.

In view of the above, it is an object of the subject invention to provide an apparatus and method for providing plywood panels of improved quality.

It is another object of the subject invention to more efficiently remove and patch defects in the outer veneer layers of plywood panels.

It is an additional object of the subject invention to provide a method and apparatus for providing plywood panel patches that substantially conform to the shape of the original defect in the panel.

It is a further object of the subject invention to provide a method and apparatus for automatically detecting defects in a plywood panel, removing the detected defects and providing a patch of the appropriate size.

It is still another object of the subject invention to provide an improved quality plywood panel that is substantially free of observable defects or observable patches.

SUMMARY OF THE INVENTION

The subject invention is directed to a method and apparatus for making plywood, wherein defect analysis and correction means are provided for scanning a laid up plywood panel to locate and assess defects, and subsequently to patch the sensed defects. More particularly, the defect analysis and sensing means includes an electro-optical sensing means to scan at least one surface of a laid up plywood panel. The panel and/or the sensing means are adapted to move relative to one another such that substantially the entire surface of the laid up panel can be sensed. For example, the plywood panel may be mounted on a conveyor means that is adapted to move the panel in a longitudinal direction. The sensing means then may be mounted on guide means for moving the sensing means in a lateral direction relative to the plywood panel. Alternatively, a substantially stationary sensing means may be employed to sense substantially the entire width of a panel moving relative thereto. As still another alternative, a panel may be moved into a stationary position in proximity to a sensing means for all or part of the panel to be sensed.

The sensing means preferably is an electro-optical member including at least one light source and at least one light sensor. Light from the sensing means is directed towards the surface of the laid up panel. Defects in the panel will be sensed by variations in the reflectiveness thereof.

The sensing means is adapted to determine the precise location, the size and the configuration of any defects in the panel. The derived signals which describe the sensed defects are fed to a control unit or data processor. More particularly, the location, size and shape of each sensed defect is converted to x-y coordinates which precisely locate and define the defect.

These coordinates derived by the defect sensing means then are used by a defect removing means which removes and/or trims the area defined by the defect. Preferably, the defect removal means comprises at least one router mounted in proximity to the panel. The router includes a planar work surface and a rotating bit extending a predetermined distance below the work surface. The router responds to the coordinate instructions received from the control unit data processor as to the location, size and shape of the measured defect. Thus, the router will be advanced to a proper location for the router bit to remove a portion of the panel corresponding to the size and shape of the defect. In instances where the defect comprises an aperture in the top ply of the panel, the router bit will effect a proper trimming of the aperture. The router bit may be configured to form a recess having walls substantially perpendicular to the surface of the panel. Alternatively, the router bit can be selected to provide tapered or chamfered walls on the recess. The specific configuration of the recess walls cut by the router will depend upon the particular type of patch material used therein.

The defect removal means can comprise either a single router adapted to move relative to the panel or a plurality of routers adapted to work in coordination with one another. The defect removal means can be part of the means that senses the defects. Alternatively, the defect removing means can be separate and spaced from the sensing means, provided that both the sensing means and the defect removal means are in communication with the control unit or data processor.

The defect removal means can be adapted to remove a portion of the panel corresponding to the precise location, size and shape of the sensed defect. Alternatively, the defect removal means can be adapted to remove a portion of the panel a preselected amount larger than the sensed defect. Similarly, the shape of the area to be removed can be precisely the same shape as the sensed defect or can be any of a preselected array of shapes programmed as instructions to be carried out by the control unit. For example, the defect removal means can be adapted to remove a circular section slightly larger than and encompassing the sensed defect. Alternatively, the defect removal means can be programmed to remove generally oval shaped portions of the panel sufficiently large to insure complete removal of the defect. The oval shapes can be selected to suggest a properly formed knot in the panel.

The apparatus of the subject invention further includes a patching means adapted to dispense a flowable patching compound into the recess formed in the panel by the defect removal means. The patching means also is in communication with the control unit or data processor to apply the patching compound to the precise location of the sensed and removed defect. Furthermore, the patching means is adapted to insure that a sufficient amount of patching compound is applied to completely fill the recess formed in the panel. The patching means can be incorporated into a common apparatus with the defect removal means and or the sensor means. Alternatively, the patching means can be a separate apparatus in communication with the control unit for coordinating the data sensed by the defect sensing means. The particular type of flowable compound dispensed by the patching means can vary in accordance with the type of wood used in the panel, the relative sizes of defects being sensed, removed and filled, and the intended end use of the panel being formed.

After the defects in the panel have been properly sensed, removed and filled, the entire surface of the panel is sanded to remove splinters, defects too small to be sensed, and excess patching compound. The panel then may be passed to one or more arrays of radial saws to edge trim the panel, and/or to cut the panel into a plurality of smaller panels. The panel then is advanced to appropriate locations for stacking and shipping.

The process utilizing the apparatus described above includes the steps of cutting veneer sheets for use in plywood panels and subsequently drying the veneer sheets in the known manner. The dried veneer sheets then are passed directly to locations for applying adhesive to selected sheets, laying the sheets up in a stacked array and pressing the sheets together. These steps are performed in substantially the known manner. However, it is important to emphasize that it unnecessary to carry out the time consuming veneer preparation that had been an integral part of the prior art processes for forming plywood. Rather, the veneer sheets are laid up and formed into plywood panels without first correcting any defects that may exist in the veneer sheets from which the panels are formed.

The process of the subject invention further includes the step of sensing the location, size and/or shape of defects in one of both face panels of the plywood sheet. The sensing preferably is carried out using electro-optical means adapted to sense knots, knot holes, or other such defects in the panel. The sensed information is stored in a control unit in the form of derived signals, such as coordinates, which describe the location, size and/or shape of the defect. The process then includes the step of advancing the panel to a defect removal means, such as a router or array of routers. The defect removal means is in communication with the control unit in which the derived signals from the sensing means are stored. The defect removal means therefore is directed to the appropriate locations on the panel at which defects have been sensed, and is operative to remove the sensed defects. The defect removal means can be adapted to remove a portion of the panel corresponding to the precise size and shape of the defect, or can be adapted to remove a portion of the panel of a preselected size and shape larger than the sensed defect.

The process of the subject invention further includes the step of patching the sensed and removed defects. The patching preferably is carried out by applying a flowable patching compound to the area of the removed defect. Thus, the patching means is in communication with the control unit and is adapted to apply the patching compound only in the area at which the defect has been sensed and removed. The process preferably is operative to apply an amount of patching compound which reflects the size of the removed defect.

Finally, the process of the subject invention includes the steps of advancing the properly patched panel to locations for sanding the panel to remove excess patch material and any other minor defects that may be present in the panel. The panel may also be trimmed and cut into appropriate sizes and subsequently stacked for shipping.

Although the subject process has been described as being directed to sensing, removing and patching defects in a laid up panel, the process and apparatus of the invention can be used to similarly correct defects in single veneer sheets such as those used in furniture or cabinet making. However, in view of the results obtained by the above described process and apparatus, it is unnecessary to first correct defects in veneer sheets that will ultimately be incorporated into a plywood panel. Rather, highly satisfactory results are obtainable by dealing with defects after the multi-layered panel has been formed.

DETAILED DESCRIPTION OF THE PREFERRED EMBODIMENT

Figure 1:
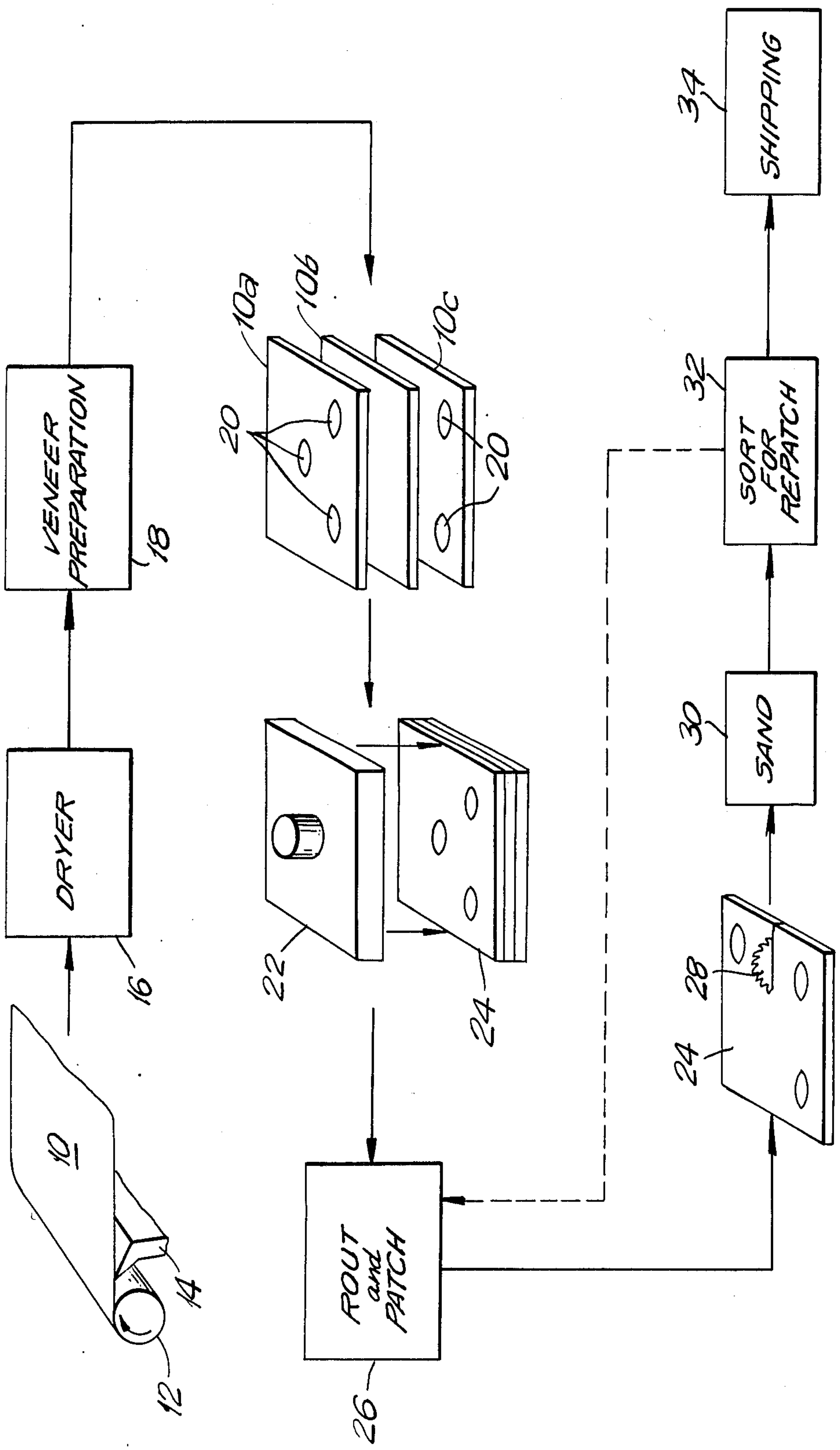
(PRIOR ART) FIG. 1
FIG. 1 is a schematic flow chart of a prior art process for making plywood.

The prior art method and apparatus for producing plywood is illustrated schematically in FIG. 1. More particularly, the prior art process includes the first step of forming one or more sheets of veneer 10 from a log 12 by using a log peeling apparatus which is illustrated in schematic form and indicated generally by the numeral 14. The veneer 10 formed by the log peeling apparatus 14 then is passed to a veneer drier 16 which appropriately removes moisture from the veneer sheet 10.

The veneer sheet 10 then is passed to a veneer preparation station 18 in the prior art process of FIG. 1. At the veneer preparation station 18, the dried elongated sheets of veneer are appropriately cut into rectangular sheets for further processing. The sheets 10 then are visually scanned to assess defects in accordance with the prior art process. Defects in the veneer sheets 10 then are removed and patches are inserted as described in the several prior art references listed above. Most typically, the prior art veneer preparation station will include well-known prior art Raiman or Skoog machines which form boat-shaped apertures in the veneer sheet 10 at the location of any defects observed therein. These boat-shaped apertures then are filled with appropriately shaped and sized wooden patches 20. The apertures formed in the veneer sheet 10 and the patches 20 inserted therein are all of uniform size to eliminate the need for carefully matching patches to individual observed defects.

A plurality of such veneer sheets **10*a*, 10*b* and 10*c* are then laid up with the grain on alternate sheets being aligned in perpendicular relationship to one another. As illustrated in FIG. 1, the exterior veneer sheets 10*a* and 10*c* are provided with boat-shaped patches 20 that are substantially identical to one another. The interior sheet 10*b*** (or sheets) generally are not provided with patches because the interior sheets are not observed and because the strength and performance of the completed panel is generally unaffected by the presence or absence of the patched defects.

The panel laid up as described above is then passed to a press 22 which exerts heat and pressure on the veneer sheets **10*a–c* to activate the adhesive applied therebetween and form a panel 24**.

The panel 24 formed according to the prior art process then is passed to a rout and patch station 26 where the completed panel again is visually scanned to determine the absence or presence of any remaining defects. Any such defects may be removed, if necessary, by routing and/or by patching any of the known techniques as described above. The panel 24 may then be passed to a sawing station 28 where it is trimmed and, if necessary, cut into smaller pieces. The trimmed panels then are sanded at sanding station 30 to be placed substantially in condition for their intended use. However, the known process invariably includes extensive visual checking of individual panels to assess the quality of work performed in the preceding steps. As a result of this visual checking, panels produced according to the prior art may be sorted out for repatching as illustrated schematically at the "sort for repatch" station 32 in FIG. 1. Defective panels are returned to the rout and patch station 26 where defects may be further corrected. Depending on the nature of the observed defect, portions of the defective panel 24 may require further cutting or trimming by sawing station 28 and subsequent sanding at station 30. Completed panels then are passed to station 34 where they are shipped for distribution and use.

The most significant shortcomings of the prior art process described above and illustrated schematically in FIG. 1 is that there are several steps which require visually scanning the veneer sheets 10 or completed plywood panels 24 to locate defects and to subsequently patch those defects based on the visual observations of the person performing the scan. Additionally, the various scanning and patching observations are carried out independently of one another and involves substantial repetition. Furthermore, the quality and consistency of the plywood panels produced by the prior art processes is substantially dependent upon the visual observations of the scanners or checkers. Thus, the plywood manufacturing process is quite labor intensive, is subject to human failure and is also subject to the inconsistencies caused by several individuals applying their own subjective standards. The resulting panels also have several deficiencies in that the panels 24 produced by the prior art process are characterized by a plurality of substantially identical patches 20 formed in the outer surfaces in the panels 24. Plywood panels 24 formed in this manner may be acceptable where aesthetic appearance is not important or where the panel will eventually be painted or otherwise coated. These panels are often referred to in the trade as grade B or grade C panels. However, the presence of the patches 20 substantially prevents the panels 24 from being used where the aesthetics of the panels are important. Thus, the grade A panels which require at least one aesthetically attractive face involve a much more complicated and limiting selection of veneer sheets with a corresponding increase in cost.

Figure 2:
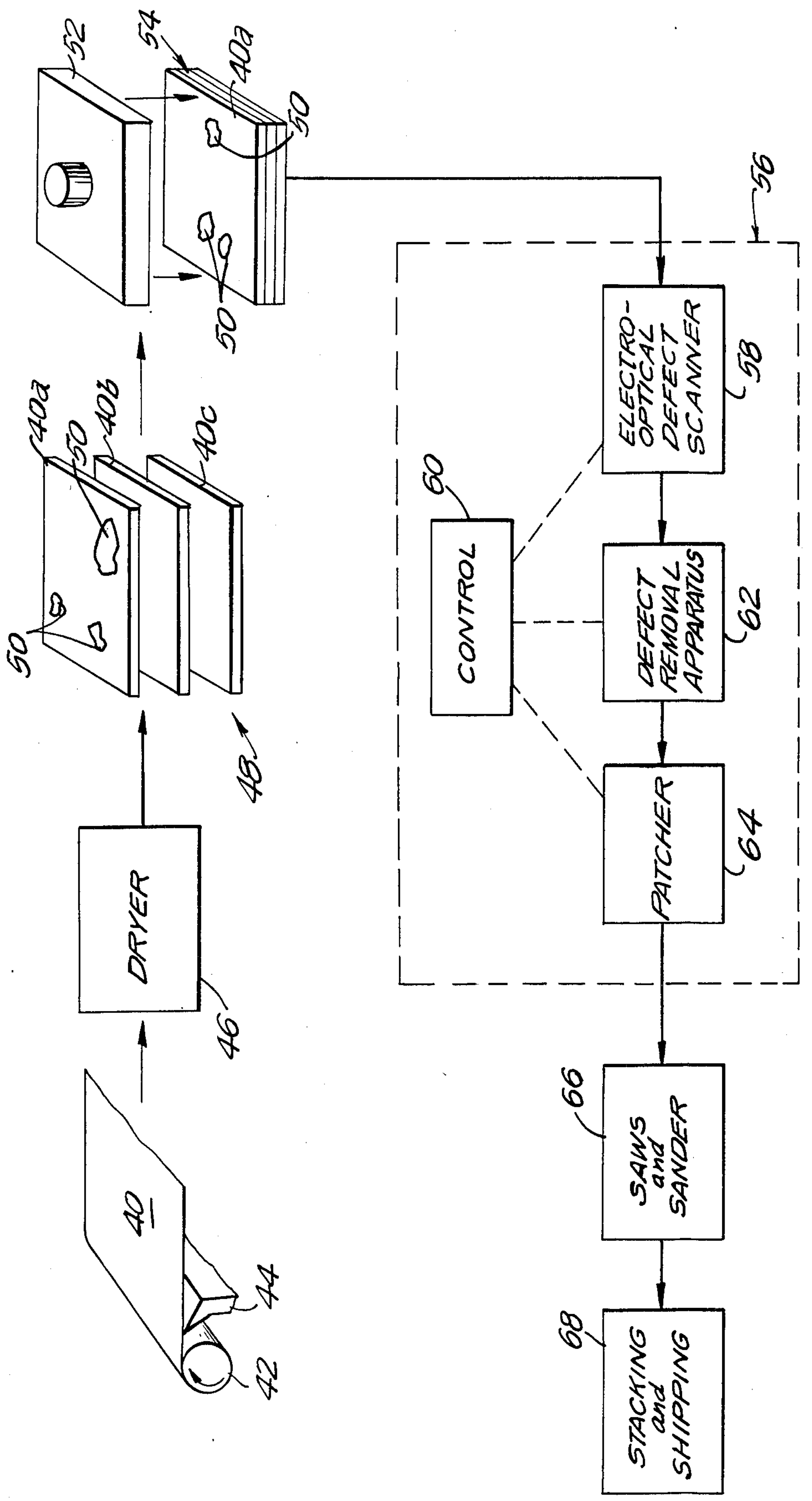
FIG. 2 is a schematic flow chart illustrating the process of the subject invention.

The process of the subject invention is illustrated schematically in FIG. 2. Briefly, the process shown in FIG. 2 includes the formation of a veneer sheet 40 from log 42 by a log peeling apparatus or lathe 44. The formation and drying of the veneer sheets 40 as illustrated schematically in FIG. 2 is substantially similar to the comparable steps of the prior art process which was illustrated schematically in FIG. 1. At this point, the process of the subject invention as illustrated schematically in FIG. 2 departs significantly from the prior art processes. More specifically, the dried veneer sheets are passed directly to a veneer lay-up station 48 where adhesive is appropriately applied to veneer sheets 40*a*, 40*b* and 40*c* and where the veneer sheets 40*a–c* are laid up in face-to-face relationship. Thus, the process of the subject invention entirely eliminates the time consuming, costly and ultimately unsightly veneer preparation and patching of the prior art. It follows that the face panels 40*a* and 40*c* will include any knots, holes or other such defects which are indicated schematically by the numeral 50. The laid up panels 40*a–c* then are passed to the press 52 which, through the application of heat and pressure, secures the sheets 40*a–c* into an integral plywood panel 54. Again, as illustrated schematically in FIG. 2 the face veneer sheet 40*a* will still retain the defects 50 that had been present in sheet 40*a* prior to the formation of plywood panel 54.

The formed plywood panel 54 then is advanced to the defect analysis and correction station indicated generally by the numeral 56 in FIG. 2. The defect analysis and correction station 56 may comprise a single multifunction apparatus or a plurality of separate devices in communication with one another. As illustrated schematically in FIG. 2, the defect analysis and correction station first includes an electro-optical defect scanner 58. The electro-optical defect scanner 58 includes at least one light source and at least one light sensor. The light source is adapted to transmit a light signal toward the panel 54, while the light sensor is adapted to receive optical signals reflected from the plywood panel 54.

The electro-optical defect scanner 58 is in communication with a control 60 which receives and analyzes the derived signals from the electro-optical defect scanner 58. More particularly, the control unit 60 is operative to analyze the signals received from the light sensor in the electro-optical defect scanner 58. Such derived signals are electronically compared to known signals indicative of defects in the plywood panel 54. For example, the electro-optical defect scanner 58 can be operative to transmit an electrical signal to the control unit 60 which varies in accordance with the intensity of the light signal reflected from the panel 54. Derived optical signals corresponding to knots, knot holes or other apertures in the panel 54 typically will be less intense than the signal derived from nondefective areas of the panel 54. Thus, derived optical signals with lower intensity may correspond to defects warranting correction.

The derived optical signals are converted into electrical signals which are sensed and analyzed by the control unit 60. It is also essential that the electro-optical defect scanner 58 precisely identify the location and preferably the size of the defect 50 that is sensed. These locational characteristics then can be transmitted to the control unit 60 for storage and analysis.

This defect analysis and scanning can be accomplished by having a plurality of light sensors in the electro-optical defect scanner 58 or by having at least one movable light source and light sensor in the electro-optical defect scanner 58. The apparatus may be adapted to have the scanning of panel 54 be carried out as panel 54 is moving relative to the electro-optical defect scanner. Alternatively, the panel 54 may be stopped for an increment of time during which the scanning of the entire panel 54 is carried out. In still another alternative, the panel 54 may be stationary relative to the electro-optical defect scanner while a portion of the panel 54 is scanned and analyzed. The panel 54 may then advance incrementally while other portions thereof are scanned and analyzed. In still other embodiments, each panel 54 will effectively be divided into areas that will be optically scanned and electrically analyzed by the electro-optical defect scanner 58. For example, a plurality of such electro-optical defect scanners may be provided with each such unit being adapted to cover a predefined area of the panel (e.g. 4'×4' square). In still other embodiments, a selected area of the panel can be electro-optically recreated as a matrix of light reflective characteristics across a given area of the panel 54. These electrical data will effectively define areas of the panel at which defects exist based on variations in light reflective characteristics.

The control unit 60 is operative to receive the derived signals from the electro-optical defect scanner 58, to compare the derived signals to known values which correspond to defects, and to store locational data which describes both the relative position and preferably the size of each sensed defect 50. These data are stored and retained for the entire time during which a panel 54 passes through the defect analysis and correction station 56. Upon complete passage of the panel 54 through the defect analysis and correction station 56, the memory of the control unit 60 pertaining to an individual panel 54 can be erased.

The panel 54 next passes to the defect removal apparatus 62. Preferably the defect removal apparatus 62 comprises at least one router in communication with the control unit 60. More particularly, the control unit 60 directs the defect removal apparatus 62 to the precise location on the panel 54 at which a defect 50 has been sensed. The sensed and stored parameters describing the location, size and shape of each defect 50 enables the defect removal apparatus to precisely remove an area of panel 54 corresponding to the sensed defect 50. For example, the defect removal apparatus may comprise a router having a rotating bit extending from a generally planar work surface. The work surface is adapted to be moved into face-to-face contact with the surface of the panel 54. The rotating bit can be dimensionally set to cut into panel 54 a distance corresponding to the thickness of the face ply 40*a*. The router of the defect removal apparatus 62 then can be moved in accordance with the signals from control unit 60 to remove a portion of the face ply 40*a* at which the defect 50 had existed. The defect removal apparatus 62 and the control unit 60 can coordinate with one another to cut out a portion of panel 54 generally corresponding in size and shape to the sensed defect 50. Alternatively, the defect removal apparatus 62 can be adapted to cut panel 54 with any of a plurality of preselected sizes and shapes.

The panel 54 then is advanced to the patcher 64 of the defect analysis and correction station 56. The patcher 64 also is in communication with the control unit 60 and is directed to the precise location of the previously sensed and removed defect 50 in panel 54. The patcher is adapted to dispense a controlled amount of flowable patch material into the indentation or aperture created by the defect removal apparatus. The amount of patch material dispensed by patcher 64 can be variable in accordance with the size of the indentation or defect created by the defect removal apparatus 62 as reported by the control unit 60. The patch material can be a urethane, epoxy, polyester or fiberglas foam material and preferably is prepared just before use by mixing the polymer or monomer with a catalyst. The amount of patch material dispensed should be sufficient to completely fill and/or partially overflow the defect or aperture formed in the panel 54.

After application of the patch material by the patcher 64, the panel 54 passes from the defect analysis and correction station 56 to an appropriate station or stations for sawing and/or sanding. The sawing would be carried out to trim the panel 54 and/or to cut the panel 54 into smaller panels. For example, the panel 54 may initially be approximately 8 feet by 12 feet, and will be cut into a plurality of four by eight or four by four panels. The sander then is operative to smooth out the surface of panel 54 including the removal of any patch material that may have overflowed from the indentation or aperture formed in the panel 54 by the defect removal apparatus 62. The panel 54 then is advanced directly to the stations for stacking and shipping.

Figure 3:
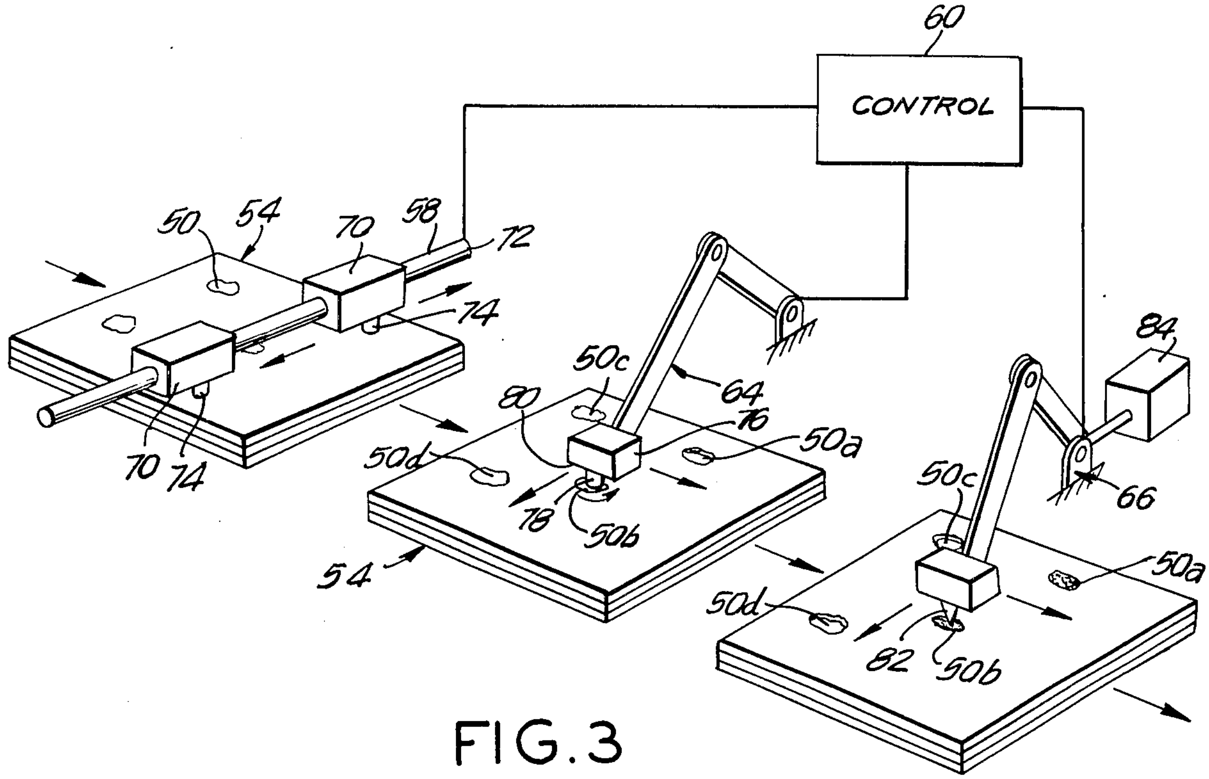
FIG. 3 is a schematic perspective view of the defect analysis and correction station of the subject invention.

Turning to FIG. 3, the defect analysis and correction station 56 of the subject invention is illustrated schematically. More particularly, the laid up panel 54 with untreated defects 50 existing therein is moved into proximity to the electro-optical defect scanner 58, which preferably includes at least one electro-optical scanner 70 which is operative to send a light signal to the panel 54 and to receive light signals therefrom. The electro-optical scanning unit 70 may be movably mounted on bar 72. The electro-optical unit 70 may be operative to move relative to panel 54 during the scanning operation, or alternatively may be adjustably movable into various fixed positions from which they will scan the panel 54 for defects 50. Although two such units 70 are depicted schematically in FIG. 3, it is understood that one such unit 70 may be used or that considerably more than two such units may be used for each panel 54. Similarly, each electro-optical scanning unit 70 is schematically depicted as including a single light source and sensor member 74, but it is understood that each such scanning unit 70 can include a plurality of light sources and/or light sensors.

The defect data sensed by the electro-optical defect scanner 58 is transmitted to the control unit 60 which analyzes the various sensed data and determines the precise location and preferably size of defect 50 existing in panel 54. The panel 54 then is advanced to the defect removal apparatus 64 which preferably includes at least one routing apparatus 76. The routing apparatus 76 includes a rotatable cutting bit 78 extending a selected distance below a cutting surface 80. The defect removal apparatus 64 is in communication with the control unit 60 and is operative to cut away the portion of each panel 54 corresponding to a defect 50. As illustrated in FIG. 3, the defect 50*a* is schematically shown as having already been removed or routed by the defect removal apparatus 64. Similarly, defect 50*b* is shown as being worked upon by the router of the defect removal apparatus 62. On the other hand, defects 50*c* and 50*d* are shown as not having been cut or removed by the defect removal apparatus 64.

The panel 54 then advances to the patcher 66. As explained above, the patcher 66 also is in communication with the control unit 60 and is directed to the precise location of defects 50 that have been previously sensed and removed. The patcher 66 includes a nozzle portion 82 which is adapted to dispense a controlled amount of flowable patching material, as described above, that can be mixed and stored in storage unit 84. As illustrated in FIG. 3, the defect 50*a* is shown as already having been patched while the defect 50*b* is shown as undergoing patching by the patcher 66. On the other hand, defects 50*c* and 50*d* are illustrated as not having been patched.

Figure 4:
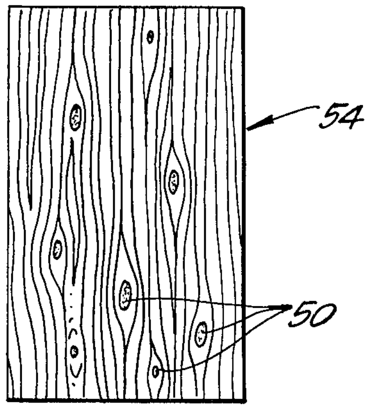
FIG. 4 is a top plan view of the plywood panel produced in accordance with the subject invention.

Turning to FIG. 4, the completed panel 54 is shown with a plurality of defects that have been patched in accordance with the apparatus in process of the subject invention. It is observed that each patched defect is of substantially different size and shape thereby reflecting the actual differences of unpatched defects existing in a panel. The defects 50 are shown as resembling attractive knots and such that may naturally and attractively exist in a wooden plank. Thus, panels 54 formed in accordance with the subject invention are substantially more attractive than the prior art panels having the plurality of identical boat-shaped wooden patches inserted therein. Furthermore, panels formed in accordance with the subject invention can be formed more economically and efficiently than prior art panels of either grade A or B.

A single defect analysis and correction station 56 as described above and illustrated in FIGS. 2 and 3, when incorporated into a plywood production line, will be capable of completing approximately 1,500 patches per hour. This is a substantial improvement over existing manual patching and production rates. Furthermore, a typical plywood production mill is likely to have five lines each of which includes two people operating routers and three people applying patches, or about twenty-five people for each employment shift. It is believed that the subject defecting analysis and correction station 56 when incorporated into such a plywood production mill would require only about ten people per employment shift to insure proper feeding of panels into and out of the apparatus and to insure proper operation of the apparatus and inspection. This personnel saving could amount to several hundred thousand dollars each year for each employment shift.

In summary, the apparatus of the subject invention includes a defect analysis and correction means which is operative to electro-optically scan a previously laid up panel to identify defects. The location and preferably size of identified defects are stored in a control unit that is in communication with the defect scanner. A defect removal apparatus also is in communication with the control unit and is operative to remove the defect from the previously laid up panel. A patcher also in communication with the control unit is then operative to fill the indentation or aperture existing at the location of the defect with an appropriate flowable patch compound. This apparatus eliminates the need to scan and patch veneer sheets prior to the formation of the plywood panels. After the panels have been properly patched by the defect analysis and correction means, the panels are then advanced to appropriate work stations for sawing, trimming and sanding the panels as needed. The process of the subject invention includes the first step of electro-optically scanning at least one surface of the panel to identify and locate defects therein. The process then includes removing the identified and located defectes and applying a patching compound thereto.

While the invention has been described relative to a preferred embodiment, it is understood that various modifications can be made without departing from the scope of the invention as defined by the appended claims.

What is claimed is:

1. A continuous process for manufacturing plywood panels, said process including the steps of:

providing a plurality of sheets of wood veneer, each said sheet having a pluralilty of defects therein, said defects being of non-uniform size and shape;

adhering said sheets in face-to-face relationship to form the plywood panel;

electro-optically scanning at least one surface of the plywood panel to sense the location, size and shape of each said defect therein;

storing the electro-optically sensed location, size and shape data for each said defect;

routing out portions of the panel substantially corresponding to the location, size and shape of each said defect as indicated by the stored data; and applying a patching compound to the locations on said panel where each said defect had been, said patching compound being applied in an amount substantially corresponding to the volume of the removed defect as indicated by the stored data.

2. A process as in claim 1 wherein the patching compound is selected from the group consisting of urethane, epoxy, polyester or fiberglas.

3. A process as in claim 1 further comprising the step of sanding the plywood panel to remove excess patching compound.

4. A process as in claim 1 wherein the step of electro-optically scanning the panel comprises the steps of: directing light toward the panel; sensing the light reflected from said panel; converting said sensed reflected light to an electrical signal having a value indicative of the sensed light intensity; comparing parameters of said electric signal to known parameters to identify defects.

5. An apparatus for analyzing and correcting defects in a plywood panel, said apparatus comprising:

electro-optical scanning means for scanning the plywood panel and for sensing the location, size and shape of defects therein;

router means for removing portions of said plywood panel corresponding to the location, size and shape of each said sensed defect;

patching means for applying a flowable patching compound to the area that had been characterized by the defect; and control means operatively connected to said scanning means, said router means and said patching means, said control means being operative to store the location, size and shape data sensed by said scanning means, and being operative to direct said router means to each said defect and to remove a portion of said panel corresponding to the size and shape of each said defect, said control means further being operative to direct the patching means to each area that had been a defect and to dispense an amount of the patching compound corresponding to the volume of the removed defect.

6. The apparatus of claim 5 further comprising sanding means for sanding the panel and removing excess patch material therefrom.

7. An apparatus as in claim 6 wherein said patching means further comprises storage means for storing the patching compound to be applied to the panel by the patching means.

8. An apparatus as in claim 6 wherein the electro-optical scanning means comprises at least one optical source and at least one electro-optical sensor, said electro-optical sensor being adapted to sense light from said light source reflected by said plywood panel.

9. An apparatus as in claim 8 wherein said control means is operative to compare the values of light intensity sensed by said electro-optical scanning means and comparing said sensed light data to known sensed data to identify the defects.

10. An apparatus as in claim 9 comprising a plurality of said electro-optical scanning means.

11. An apparatus as in claim 8 wherein the router means comprises at least one router.

* * * * *